United States Patent [19]
Kurokami et al.

[11] Patent Number: 5,668,833
[45] Date of Patent: Sep. 16, 1997

[54] DECISION-FEEDBACK TYPE EQUALIZER

[75] Inventors: Yuzo Kurokami; Hideki Matsuura, both of Tokyo, Japan

[73] Assignee: NEC Corporation, Tokyo, Japan

[21] Appl. No.: 616,534

[22] Filed: Mar. 15, 1996

[30] Foreign Application Priority Data

Mar. 15, 1995 [JP] Japan .................................. 7-084675

[51] Int. Cl.$^6$ .............................. H03H 7/30; H03H 7/40; H03K 5/159
[52] U.S. Cl. ...................... 375/233; 375/232; 364/724.2; 333/28 R
[58] Field of Search ........................ 364/724.2; 375/233, 375/232; 333/28 R

[56] References Cited

U.S. PATENT DOCUMENTS

| | | | |
|---|---|---|---|
| 4,328,585 | 5/1982 | Monsen | 375/14 |
| 5,297,165 | 3/1994 | Ueda et al. | 375/12 |
| 5,398,259 | 3/1995 | Tsujimoto | 375/349 |
| 5,440,583 | 8/1995 | Koike | 375/233 |
| 5,524,125 | 6/1996 | Tsujimoto | 375/347 |

FOREIGN PATENT DOCUMENTS 4-35113  2/1992  Japan .

*Primary Examiner*—Stephen Chin
*Assistant Examiner*—Mohammad Ghayour
*Attorney, Agent, or Firm*—Sughrue, Mion, Zinn, Macpeak & Seas

[57] ABSTRACT

A decision-feedback type equalizer comprising a forward equalizer for receiving digital pre-equalization signals and error signals as input signals, for reducing intersymbol interference caused by the lead echo of the pre-equalization signals, and for outputting forward equalization signals; a backward equalizer for reducing intersymbol interference caused by the delay echo of input signals, and for producing output in the form of backward equalization signals; an adder for adding forward equalization signals and backward equalization signals, and for outputting equalization signals; a decision device for comparing the equalization signals with reference values, and for outputting decision signals; a subtracter for subtracting the equalization signals and decision signals, and for producing and outputting error signals which are differences; an alarm emitter for detecting, from the signal states of the error signals, whether an abnormal state exists, and for emitting an alarm when an abnormal state is detected; and a selection circuit which, depending on whether an alarm emitter output alarm signal is present or absent, is used for selecting either equalization signals or decision signals, and which, when there is alarm signal input, is used for selecting equalization signals and for supplying them as input signals to the backward equalizer, such that detection of the alarm condition reduces propagation or magnification of errors caused by noise.

3 Claims, 5 Drawing Sheets

DECISION-FEEDBACK TYPE EQUALIZER

BACKGROUND OF THE INVENTION

1. Field of the Invention

The present invention relates to a decision-feedback type equalizer, and more particularly to a decision-feedback type equalizer which is employable in a digital radio communications demodulation unit for the purpose of effecting automatic equalization in respect of transmission channel waveform distortion that arises due to fading or amplitude fluctuation, etc.

2. Description of the Prior Art

In recent years, there have been advances in modulation systems to multivalue systems, in order to make more effective use of frequencies in digital radio communication systems. On the other hand, as the number of multivalues increases, so the effects of transmission channel distortion caused by fading, etc. become greater. If intersymbol interference, etc. caused by transmission channel distortion is to be eliminated, it is necessary to effect interference compensation by means of an equalizer.

Devices known conventionally as equalizers include a decision-feedback type equalizer using transversal filters (e.g., the disclosure of Japanese Laid-open Patent Application No. 4-35113). FIG. 1 is a block diagram of one example of this conventional decision-feedback type equalizer. As seen in this figure, this conventional decision-feedback type equalizer is constituted by an A/D converter 11, a forward equalizer (FE) 12, a backward equalizer (BE) 13, an adder 14, a decision device 15 and a subtracter 16. The forward equalizer 12 and the backward equalizer 13 are each constituted by a transversal filter.

Next, the outline of the operation of the conventional decision-feedback type equalizer shown in FIG. 1 will be described. In order to simplify the description, the case considered is one in which the modulation system is an amplitude shift keying (ASK) system with symbols of the 4 values +3, +1, −1 and −3. Further, it is assumed that the decision-feedback type equalizer has a unidimensional structure compatible with the 4-value ASK system.

A baseband signal in analog form that has been demodulated by a demodulator (not shown) is input into an input terminal 10, and is converted to a pre-equalization signal Sr in digital form by analog-digital conversion effected by the A/D converter 11 in order to allow it to be processed by the decision-feedback type equalizer, which is a digital unit. If a digital baseband signal is received from the demodulator, the A/D converter 11 can be omitted.

The pre-equalization signal Sr is input, together with an error signal Sf from the subtracter 16 which is described below, into the forward equalizer 12, where an intersymbol interference quantity that is due to "lead echo" is estimated, removal of interference is effected on the basis of this estimated quantity, and output in the form of a forward equalization signal Sfe is produced. This forward equalization signal and a backward equalization signal from the backward equalizer 13, which is described below, are added by the adder 14 to produce an equalization signal Se, and this is input into the decision device 15 and into the subtracter 16.

The decision device 15 judges which symbol has been transmitted from the modulation end by comparing the equalization signal Se and the symbols of the 4 values that can be adopted, and outputs a decision signal Sd. This decision signal Sd is input, together with the error signal Sf from the subtracter 16 which is described below, into the backward equalizer 13, where an intersymbol interference quantity due to "delay echo" is estimated, removal of interference is effected on the basis of this estimated intersymbol interference quantity, and output in the form of a backward equalization signal Sbe is produced.

The decision signal Sd is also input into the subtracter 16, which takes the difference between it and the forward equalization signal Sf to produce an error signal Sf which represents the residual of equalization by the equalizer. This error signal Sf is input both into the forward equalizer 12 and the backward equalizer 13. In this manner, the decision signal Sd produced by the decision device 15 is output to an output terminal 19.

Next, an outline description of the structure of the transversal filters which constitute the forward equalizer 12 and backward equalizer 13 will be given with reference to FIG. 2, which shows an embodiment of an equalizer constituted by a transversal filter having three taps the coefficients of which are calculated by a well-known error correction algorithm, such as the Mean Square Error (MSE) Algorithm, summarized below.

Signals that are input via an input terminal 20 have their timing matched by delay elements 21 and 22, and then are respectively supplied to a 1st tap 23, a 2nd tap 24 and a 3rd tap 25. In the case where the equalizer is the forward equalizer 12, the 3rd tap 25 is the main tap.

In the 1st tap 23, the tap input and an error signal Sf that is input from a terminal 30 are multiplied by a 1st multiplier 26a, and a correlation value for the two input signals is found. Correlation values thus obtained are integrated by an integrator 27a, and a tap coefficient, which is the temporal average of the correlation values is determined. Then, a tap output is determined by multiplying this tap coefficient and the tap input by means of a 2nd multiplier 28a. This tap output represents the signal component that leaks from the main tap into the 1st tap 23.

Similarly, the 2nd tap 24 and the 3rd tap 25 consist of respective 1st multipliers 26b and 26c, integrators 27b and 27c and 2nd multipliers 28b and 28c, and the signal components that leak from the main tap into the 2nd tap 24 and 3rd tap 25 can be taken out by the 2nd multipliers 28b and 28c. The tap outputs of the 1st–3rd taps 23–25 are each supplied to an adder 29, by which the sum total of the signal components that have leaked from the main tap into the various taps is taken out. In the case of the forward equalizer 12, the output signal of this adder 29 constitutes a forward equalization signal Sfe in which the forward intersymbol interference component is removed from the pre-equalization signal, while in the case of the backward equalizer 13, it constitutes a backward equalization signal Sbe whose sign is opposite to that of the backward intersymbol interference component and, in either case, this adder 29 output signal is output from an output terminal 31. Since the invention pertains to backward equalization, for simplicity's sake, forward equalization is not discussed further, and may be assumed to add nothing to the signal, thus, Sr=Sfe.

FIG. 3, Table 1 and 2 models will be considered in order to explain the operation of the above described equalizer. FIG. 3 is a model representation of the manner in which intersymbol interference arises in a transmission channel between a transmitter and a receiver. After going via a delay element 35 and being multiplied by the correlation value [0.5] by a multiplier 36 in a backward tap 34, a transmitted symbol St which has been input from a terminal 33 is taken to be backward intersymbol interference U. This is added to the transmitted symbol St by an adder 37, and further addition of noise N is made by an adder 38, so giving a received signal Sr, which is output to a terminal 39. It is noted that noise N is not considered in the present situation.

Table 1 shows intersymbol interference U when transmitted symbols St are transmitted through the interference addition model of FIG. 3 and shows received symbols Sr, which are the sum of transmitted symbols and backward intersymbol interference U.

TABLE 1

Received signals in transmission channel modem (without noise)

|  | 1 | 2 | 3 | 4 | 5 |
|---|---|---|---|---|---|
| Transmitted symbol (St) | +3 | +3 | −1 | +1 |  |
| Intersymbol interference (U) |  | +1.5 | +1.5 | −0.5 | +0.5 |
| Received symbol (Sr) | +3 | +4.5 | +0.5 | +0.5 | +0.5 |

FIG. 4 shows a model of a conventional decision-feedback type backward equalizer operation. In a backward tap 42, a decision signal Sd which has been subjected to timewise adjustment by the delay element 21 is multiplied by a tap coefficient [−0.5] by the multiplier 28 to produce a backward equalization signal Sbe. The adder 14 adds this backward equalization signal Sbe and a pre-equalization signal Sr input via a terminal 41, and so produces an equalization signal Se, which it outputs to the decision device 15. The decision device 15 judges this equalization signal Se and outputs a decision signal Sd to an output terminal 43.

Table 2 shows the values of backward equalization signals Sbe and decision signals Sd when the received signals Sr of FIG. 3 are input as pre-equalization signals Sr.

TABLE 2

Decision signals in a conventional decision-feedback equalizer model (without noise)

|  | 1 | 2 | 3 | 4 | 5 |
|---|---|---|---|---|---|
| Pre-equalization signal (Sr) | +3 | +4.5 | +0.5 | +0.5 |  |
| Backward equalization signal (Sbe) |  | −1.5 | −1.5 | +0.5 | −0.5 |
| Equalization signal (Se) | +3 | +3 | −1 | +1 |  |
| Decision signal (Sd) | +3 | +3 | −1 | +1 |  |

It is seen from Table 1 and Table 2 that the equalizer operation results in the production of correct equalization signals Se and decision signals Sd that coincide with transmitted signals St. It is seen, therefore, that the decision-feedback equalizer is very effective in respect of removal of intersymbol interference caused by fading that occurs in a transmission channel.

Usually, when fading occurs in a transmission channel, as well an increase in intersymbol interference due to transmission channel distortion, there is also a possibility of an increase in noise due to a fall in the electric field at reception. Although an equalizer is effective for the removal of intersymbol interference, it has no effect in the suppression of interference such as noise, etc. which occurs in an uncorrelated manner. In a decision-feedback equalizer, the effect of noise on the main signal is still greater, because of the effects of error magnification or error propagation. The effect had on the main signal by such error magnification and error propagation will be described by means of modelling.

FIG. 3, which was described earlier, will be used as a model of addition of transmission channel interference, and, this time, the effect of noise which occurs without correlation to the main signal will be taken into consideration. Table 3 notes the values of intersymbol interference U, noise N and received symbols Sr when transmitted symbols St that are the same as indicated in Table 1 are transmitted through the interference model of FIG. 3.

TABLE 3

Received signals in transmission channel model (with noise)

|  | 1 | 2 | 3 | 4 | 5 |
|---|---|---|---|---|---|
| Transmitted symbol (St) | +3 | +3 | −1 | +1 |  |
| Intersymbol interference (U) |  | +1.5 | +1.5 | −0.5 | +1.5 |
| Noise (N) |  |  | −1.2 |  |  |
| Received symbol (Sr) | +3 | +4.5 | −0.7 | +0.5 | +0.5 |

As seen from Table 3, The received symbol Sr at time 3 is affected by level [−1.2] noise, and it becomes a value different from that in Table 1.

On the other hand, the conventional decision-feedback type equalizer shown in FIG. 4 performs the same operation regardless of whether noise is present or not. Consequently, the values of the backward equalization signals Sbe, equalization signals Se and decision signals Sd when received symbols Sr (ignoring any forward equalization), as shown in FIG. 3 are input as pre-equalization signals to the terminal 41 of the decision-feedback type equalizer shown in FIG. 4 are as indicated in Table 4.

TABLE 4

Decision signals in model of conventional decision-feedback type equalizer (with noise)

|  | 1 | 2 | 3 | 4 | 5 |
|---|---|---|---|---|---|
| Pre-equalization signal (Sr) | +3 | +4.5 | −0.7 | +0.5 |  |
| Backward equalization signal (Sbe) |  | −1.5 | −1.5 | +1.5 | −0.5 |
| Equalization signal (Se) | +3 | +3 | −2.2 | +2 |  |
| Decision signal (Sd) | +3 | +3 | −3* | +3* |  |

Note: * indicates a decision error.

If attention is directed to time 3 in Table 4, it is seen that, because of the effect of the noise N, the value of the equalization signal Se becomes [−2.2] and the decision threshold value is exceeded, it is incorrectly judged that a symbol whose level is [−3] has been transmitted. Because of this incorrect decision, the error component is magnified from [−1.2] to [−2.2] (this being called 'error magnification'). At time 4 in Table 4, since this decision signal Sd in which the error has been magnified is used to produce a backward equalization signal Sbe, there is a succeeding occurrence of an error in the equalization signal Se and decision signal Sd, despite the fact that no noise is present.

The phenomenon whereby an error that occurs in one symbol also spreads in chain fashion to subsequent symbols is called "error propagation", and it occurs only in decision-feedback type equalizers which use decision signals Sd as feedback. However, this error propagation occurs only if there is a large amount of intersymbol interference and the tap coefficient of the backward equalizer is sufficiently large, and it does not occur if the tap coefficient is small.

As described above, decision-feedback type equalizers which are used in circuits that are subject to the effects of both intersymbol interference and noise have the drawback that one symbol error caused by noise triggers a succession of symbol errors.

SUMMARY OF THE INVENTION

With the foregoing in view, it is an object of the present invention to provide a decision-feedback type equalizer with which sudden deterioration of equalization capability due to an increase in noise components can be prevented.

According to the basic mode of the present invention, in order to achieve the above object, there is provided a decision-feedback type equalizer which comprises: a forward equalizer which reduces intersymbol interference caused by the lead echo of pre-equalization signals in digital form and outputs forward equalization signals; a backward equalizer which reduces intersymbol interference caused by the delay echo of input signals and produces output in the form of backward equalization signals; an adder which adds forward equalization signals and backward equalization signals and outputs equalization signals; a decision device which compares the equalization signals with reference values and outputs decision signals; a subtracter which performs subtraction operations on the equalization signals and decision signals and produces and outputs error signals which are differences; an alarm emitter which detects, from the signal states of the error signals, whether an abnormal state exists, and emits an alarm when an abnormal state is detected; and a selection circuit which, depending on whether an alarm emitter output alarm signal is present or absent, selects either equalization signals or decision signals, and which, when there is alarm signal input, selects equalization signals and supplies them as input signals to the backward equalizer.

The alarm emitter in the above basic mode is so constituted that it monitors the magnitude of error signals and, when the frequency of sufficiently large error signals exceeds a predetermined value, it outputs an alarm signal as an error rate alarm signal.

In more detail, the alarm emitter in the above basic mode comprises an error signal assessor which judges whether the magnitude of error signals is greater than a judgement threshold value, a 1st counter which counts the number of times the magnitude of error signals is judged by the error signal assessor to be at or below the judgement threshold value, and a 2nd counter which judges the number of times the magnitude of error signals is judged by the error signal assessor to be greater than the judgement threshold value, and it is so constituted that, when the value of the count of the 1st counter exceeds a first set value, the 1st counter resets the 2nd counter, and, when the value of the count of the 2nd counter exceeds a 2nd set value, the 2nd counter produces the above-noted alarm signal.

As described above, a conventional decision-feedback type equalizer is very effective at suppressing interference, since decision signals that are obtained following removal of intersymbol interference and equalization residuals are used as input for a backward equalizer. If, however, a decision error occurs because of the effects of noise, etc., there is production of a succession of symbol errors because of the effects of error magnification and error propagation.

What is done in the decision-feedback type equalizer of the present invention, therefore, is that an alarm emitter, having reference to the signal states of error signals, constantly monitors to check whether the state is one in which the effects of both intersymbol interference and noise are great (whether an abnormal state exists). Under conditions in which the effects of noise are small, a selection circuit connects the decision signal to the input of the backward equalizer, but, when abnormal states exist, alarm signals are supplied to the selection circuit and the backward equalizer input signals are changed from decision signals to equalization signals. Thanks to this, in the present invention, equalization signals are not subject to the effect of magnification of errors by the decision device, and therefore there is practically no error propagation by the feedback loop. Consequently, it is more possible than in conventional types of equalizers to prevent sudden deterioration of equalization capability due to error propagation.

The above and many other advantages, features and additional objects of the present invention will become manifest to those versed in the art upon making reference to the following detailed description and accompanying drawings in which a preferred structural embodiment incorporating the principles of the present invention is shown by way of an illustrative example.

DETAILED DESCRIPTION OF THE PREFERRED EMBODIMENTS

Figure 5:
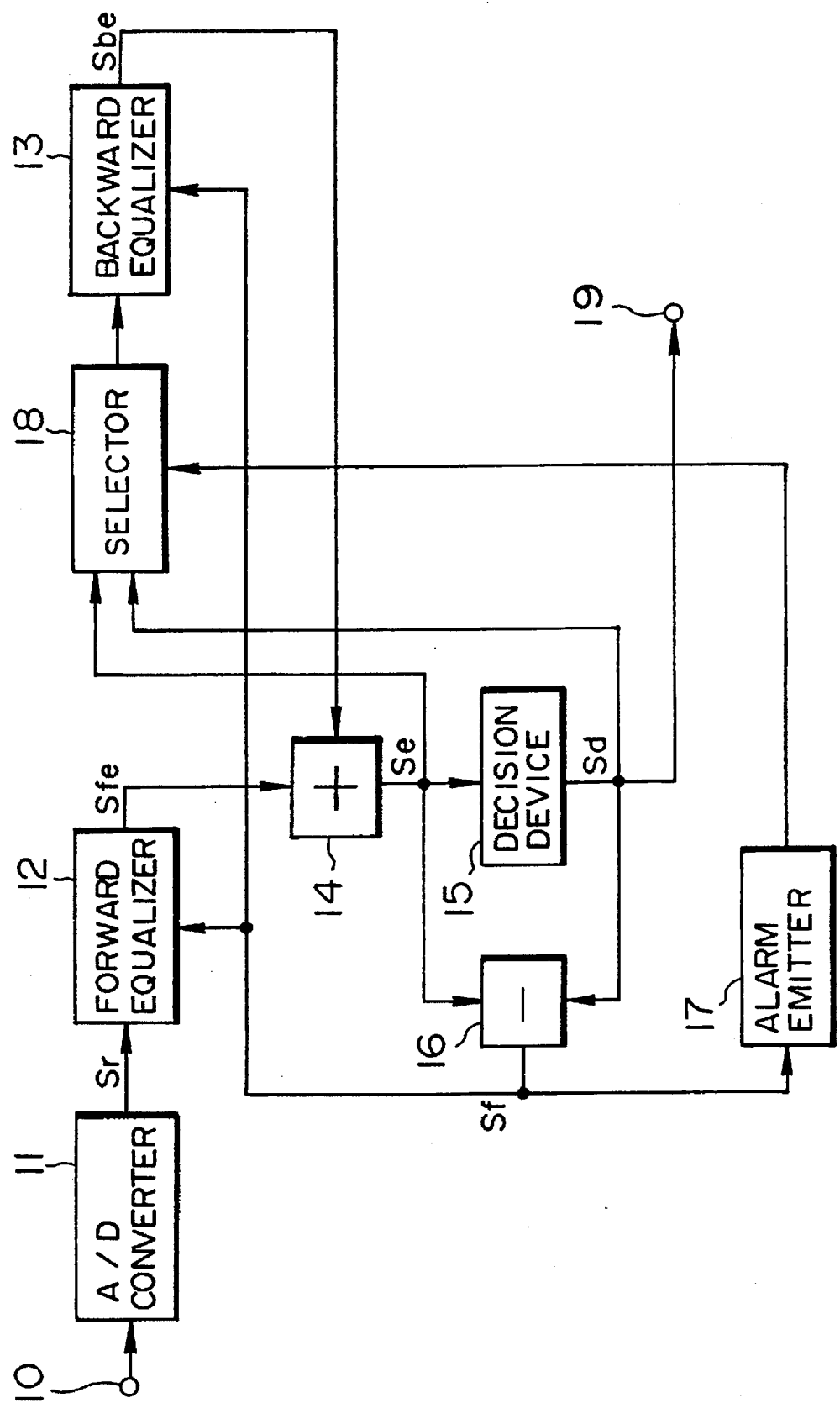
FIG. 5 is a block diagram showing the configuration of one embodiment according to the present invention.

An embodiment of the present invention will now be described with reference to the attached drawings. FIG. 5 is a block diagram of one embodiment of the decision-feedback type equalizer according to the present invention. As seen in this drawing the decision-feedback type equalizer of this embodiment consists of an A/D converter 11, a forward equalizer (FE) 12, a backward equalizer (BE) 13, an adder 14, a decision device 15, a subtracter 16, an alarm emitter 17 and a selector 18. Constituent parts which are the same as in the prior art are identified by the same symbols, and a description thereof will be omitted.

The special feature of the present embodiment is that the selector 18 is provided between the decision device 15 and the backward equalizer 13, and changeover operation of the selector 18 is controlled by the output signals of the alarm emitter 17, which receives the output error signals Sf of the subtracter 16 as input signals. In more detail, the selector 18 receives equalization signals Se from the adder 14 and decision signals Sd from the decision device 15 as input signals, and receives alarm signals from the alarm emitter 17 as control signals, and, in normal conditions, it selects the decision signals Sd, whereas in alarm conditions it selects the equalization signals Se.

The alarm emitter 17 monitors the quality of the circuit on the basis of the error signals Sf that are input, and, if deterioration below a previously set circuit quality occurs, it emits an alarm signal and effects control such that the selector 18 selects equalization signals Se. One example of this alarm emitter 17 will be described with reference to FIG. 6.

Figure 1:
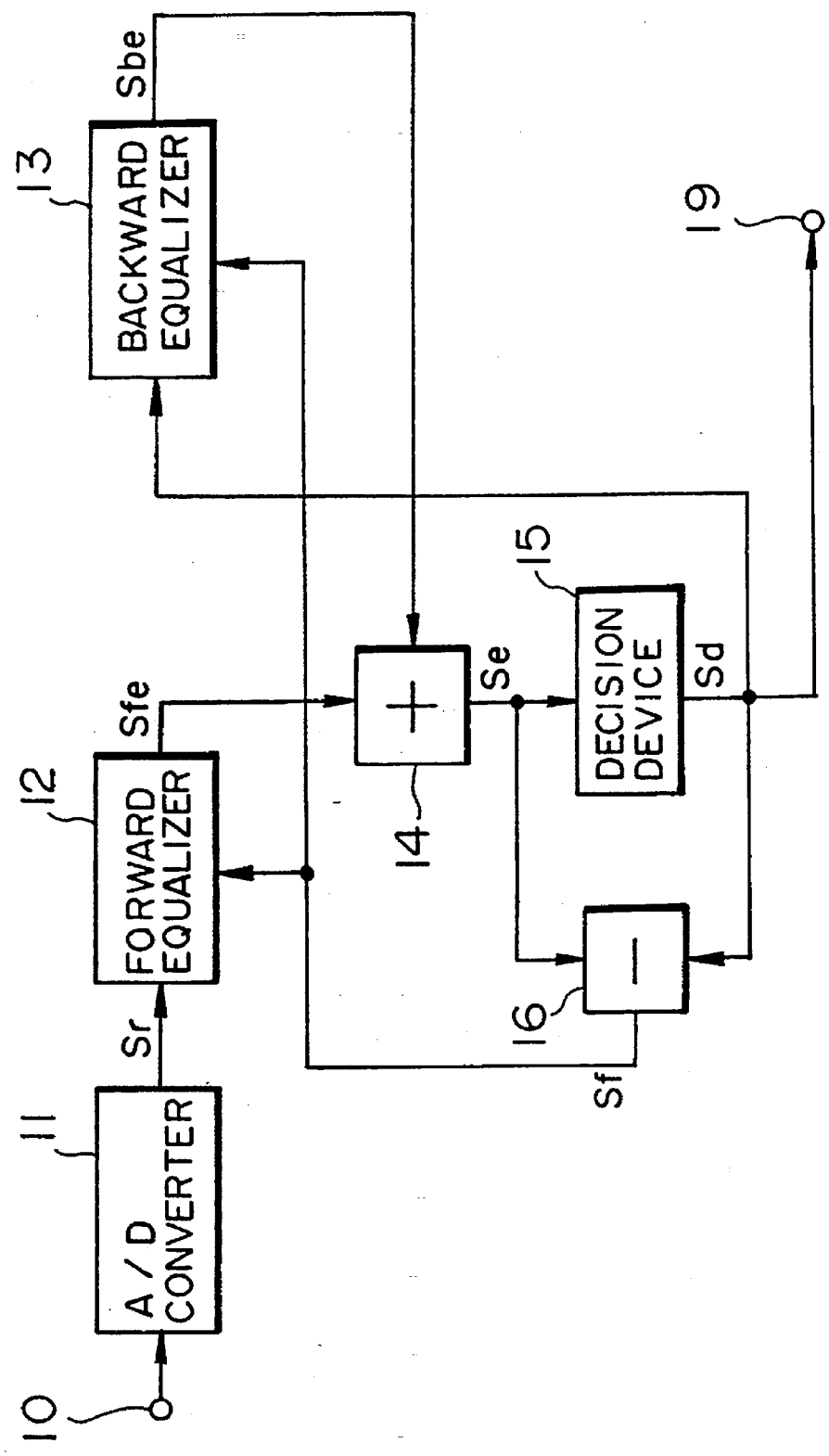
FIG. 1 is a block diagram showing an example of the configuration of a conventional decision-feedback type equalizer.
Figure 2:
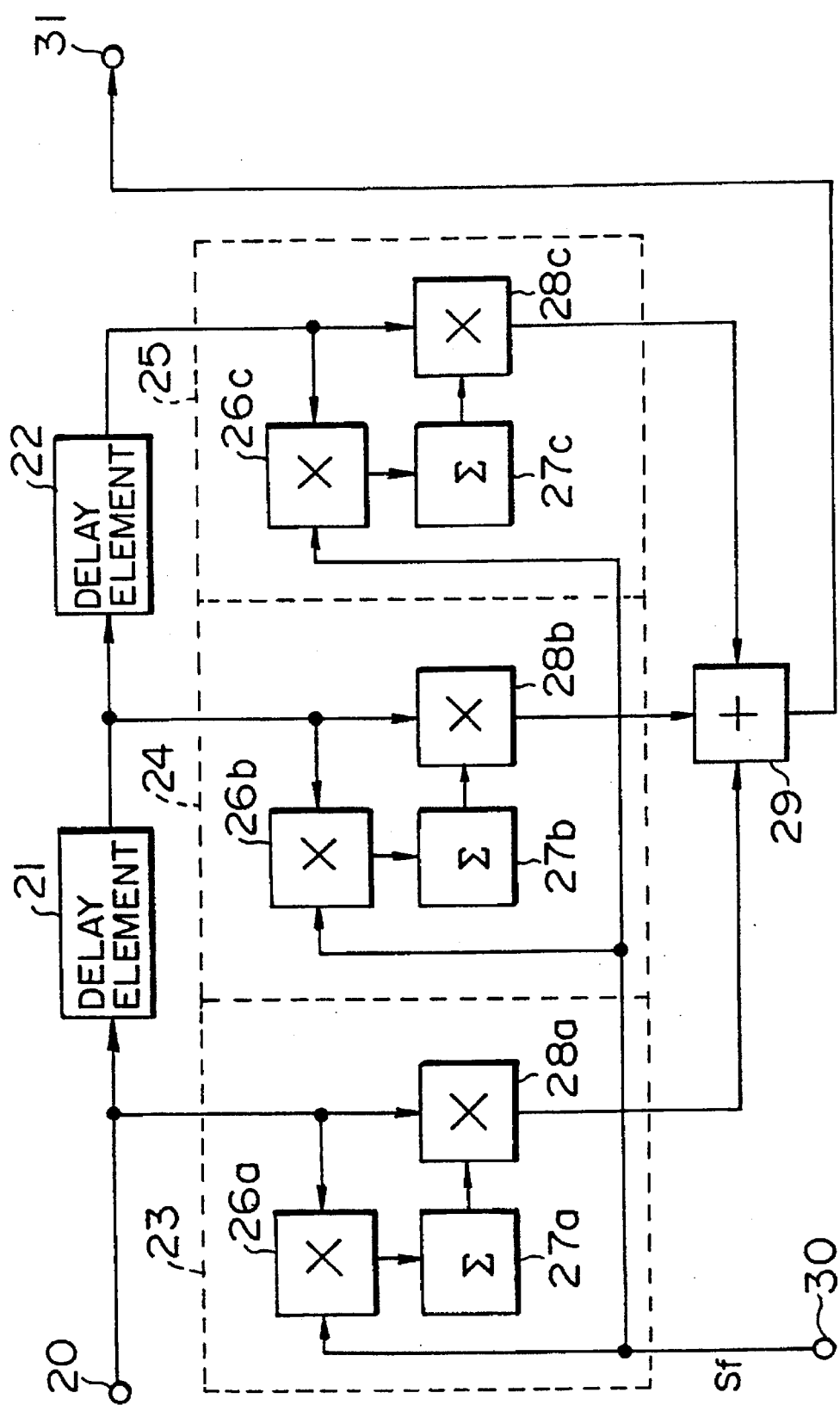
FIG. 2 is a block diagram showing an example of the configuration of a conventional transversal filter.
Figure 3:
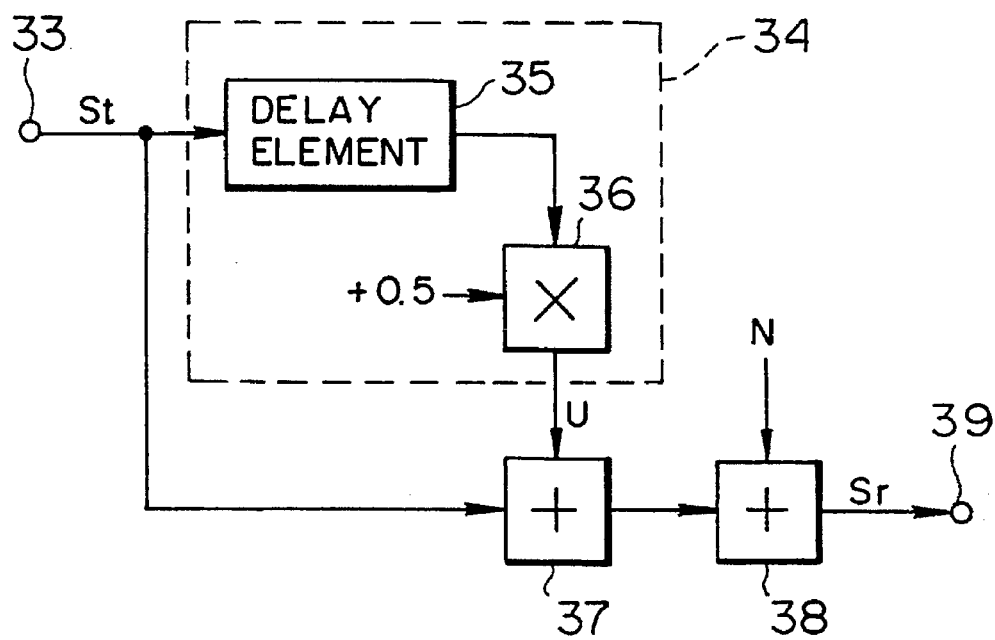
FIG. 3 is a model diagram for the purpose of describing transmission channel interference addition in a conventional decision-feedback type equalizer.
Figure 6:
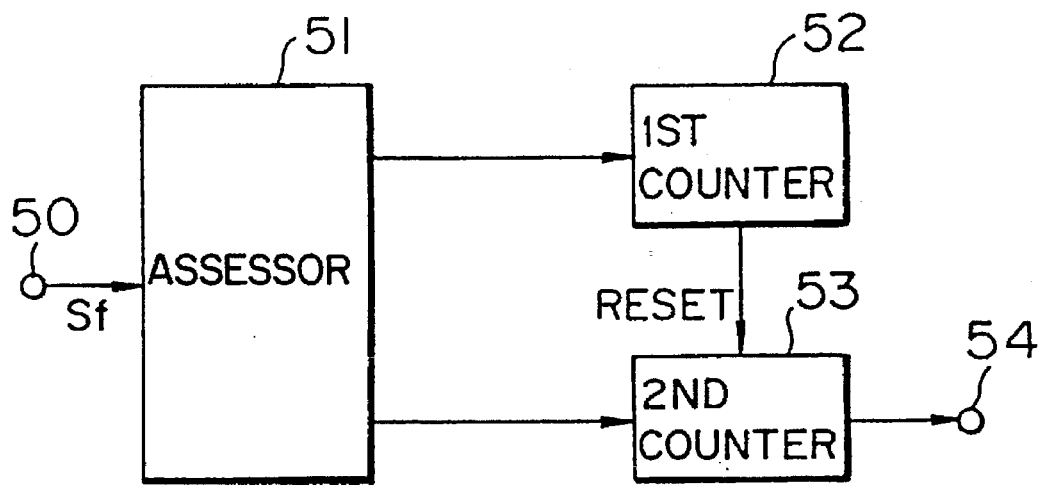
FIG. 6 is a block diagram showing the configuration of one example of an alarm emitter according to the present invention.

FIG. 6 is a block diagram of one example of the alarm emitter. The alarm emitter 17 consists of an assessor 51, and 1st and 2nd counters 52 and 53. Error signals Sf are produced by the subtracter 16 of FIG. 1, and these are differences between decision signals Sd and equalization signals Se and they represent the sums of equalization residuals, which are intersymbol interference components which were not removed by the equalizer, and of noise components, which cannot be removed by an equalizer.

These error signals Sf, which are input via an input terminal 50, are classified by the assessor 51 in FIG. 6 into two classes, depending on their magnitude. The 1st class applies in the case where the error signals Sf are small, and it indicates that the equalization residual or noise magnitude is small. The 2nd class applies in the case where the error signals Sf are large, and it indicates that the equalization residual or noise magnitude is large.

The 1st counter 52 counts the number of times that the assessor 51 judges that the signals are in the 1st class, and, when its count value exceeds a previously specified set value, it resets the 2nd counter 53. The count value of the 1st counter 52 determines the error signal Sf survey time intervals. The 2nd counter 53 counts the number of times the assessor 51 judges that signals are in the 2nd class, and, if its count value exceeds a previously specified set value, then, since there is a possibility that a decision error has occurred because of the effects of noise, it produces an alarm signal and outputs it to an output terminal 54. The count value of the 2nd counter 53 determines a threshold value for circuit quality.

As a result of the above, in normal circumstances, the input to the backward equalizer 13 is supplied from the output decision signals Sd of the decision device 15, as in the past, but in an alarm condition in which the circuit quality is below the threshold value, the selector 18 causes changeover to and input of equalization signals Se. Consequently, the backward equalizer 13 goes on the basis of the equalization signals Se, which are not affected by magnification of decision errors by the decision unit 15, and outputs backward equalization signals Sbe in which intersymbol interference caused by delay echoes has been reduced.

Because of the effects of equalization residuals, the equalization capability when the backward equalizer 13 uses equalization signals Se as input signals is slightly inferior to that in the case where decision signals Sd are used. However, if a comparison is made with the forward equalizer using pre-equalization signals, the equalization capability is greater.

Further, in this embodiment, since, as the result of monitoring of the circuit state by the alarm emitter 17, equalization signals are supplied as input to the backward equalizer 13 only when symbol errors occur because of the effects of noise, the above-noted deterioration of equalization capability can be practically ignored. Also, in this embodiment, since, in normal conditions, decision signals Sd are used as the input signals for the backward equalizer 13, as in the past, it is possible to ensure a high intersymbol interference equalization capability equivalent to that of the prior art.

Figure 4:
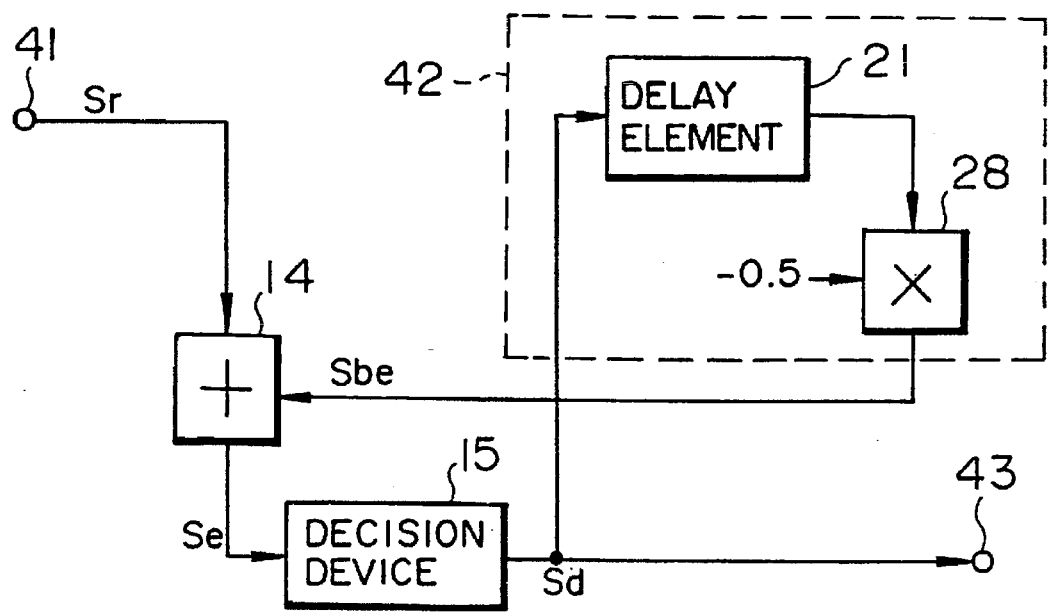
FIG. 4 is an explanatory model diagram of operation relating to a conventional decision-feedback type equalizer.
Figure 7:
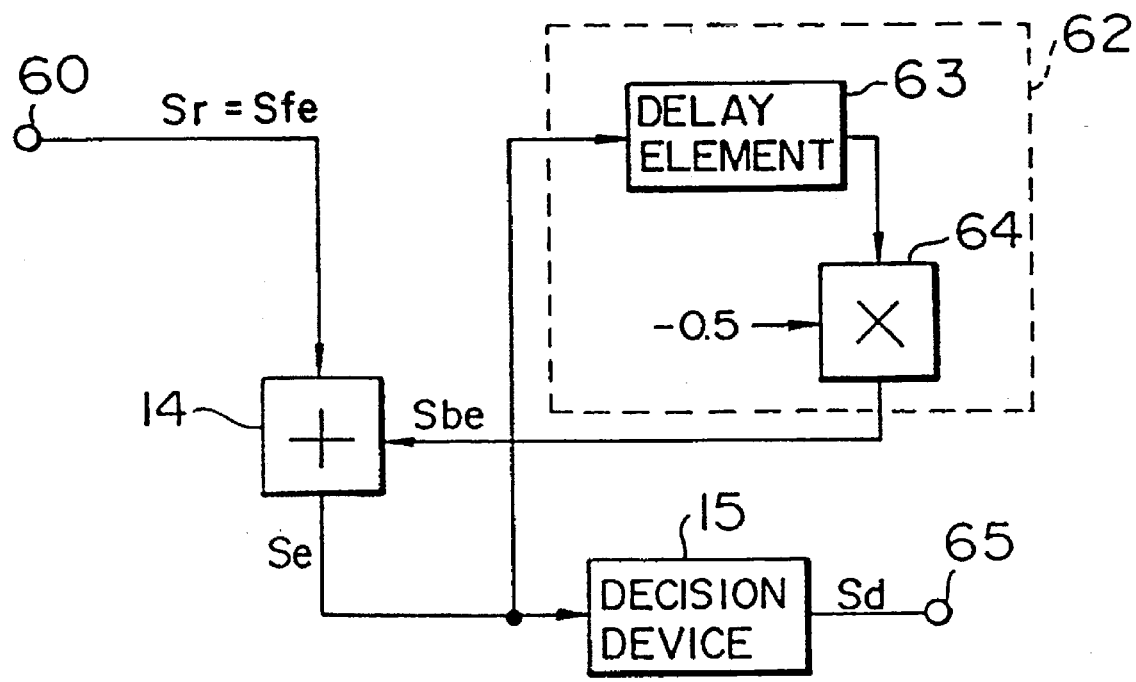
FIG. 7 is an explanatory model diagram of operation relating to the embodiment shown in FIG. 5.

A simplified model representation of the operation of the decision-feedback equalizer of the present invention in an alarm condition is shown in FIG. 7, in which constituent parts that are the same as in FIG. 5 are identified by the same symbols. In the present invention, there is a difference from the conventional model shown in FIG. 4 in that equalization signals Se taken out from the adder 14 are used as input signals for a backward tap 62.

In the backward tap 62, an equalization signal Se which has been timewise adjusted by a delay element 63 is multiplied by the tap coefficient [−0.5] by a multiplier 64 to produce a backward equalization signal Sbe. The adder 14 adds this backward equalization signal Sbe and a pre-equalization signal (received symbol) Sr input via a terminal 60 (ignoring forward equalization for the moment), and produces an equalization signal Se and outputs it to the decision device 15 and the delay element 63. The decision device 15 judges this equalization signal Se and outputs a decision signal Sd to an output terminal 65.

Similarly to Table 4, Table 5 shows the values of backward equalization signals Sbe, equalization signals Se and decision signals Sd when received signals Sr containing noise components are input into the terminal 60 as pre-equalization signals.

TABLE 5

Decision signals in model of decision-feedback equalizer of the present invention (with noise)

| | 1 | 2 | 3 | 4 | 5 |
|---|---|---|---|---|---|
| Pre-equalization signal (Sr) | +3 | +4.5 | −0.7 | +0.5 | |
| Backward equalization signal (Sbe) | | −1.5 | −1.5 | +1.1 | −0.8 |
| Equalization signal (Se) | +3 | +3 | −2.2 | +1.6 | |
| Decision signal (Sd) | +3 | +3 | −3* | +1 | |

Note: * indicates a decision error

As seen from Table 5, at time 3, there is occurrence, as in the prior art, of a decision error because of the effects of noise, but there is no occurrence of successive symbol errors due to error propagation, since, at time 4, a backward equalization signal is produced using an equalization signal Se in which there is no error magnification.

Although, for the sake of simplicity, application to a unidimensional ASK system was described in the embodiment above, the present invention is not limited to this. It may similarly be applied to multivalue quadrature modulation systems by making demodulators and decision-feedback type equalizers two-dimensional configurations. Further, although the forward equalizer and backward equalizer were both described as being 3-tap transversal filters, the number of taps is not limited to this number.

Further, although description of the prior art was given with reference to the case where the mean square errors: (MSE) method was used for the tap coefficient convergence algorithm, it is also possible to use other known algorithms that are described in the literature (eg, "Digital Signal Processing", ed. Denshi Tsushin Gakkai, publ. Corona KK, p.241), such as zero forcing (ZF) and modified zero forcing (MZF) algorithms, etc.

What is claimed is:

1. A decision-feedback type equalizer comprising:
   a forward equalizer for receiving digital pre-equalization signals and error signals as input signals, for reducing intersymbol interference caused by the lead echo of said pre-equalization signals, and for outputting forward equalization signals;
   a backward equalizer for reducing intersymbol interference caused by the delay echo of input signals, and for producing output in the form of backward equalization signals;

an adder for adding forward equalization signals and backward equalization signals, and for outputting equalization signals;

a decision device for comparing said equalization signals with reference values, and for outputting decision signals;

a subtracter for subtracting said equalization signals and decision signals, and for producing and outputting error signals which are differences;

an alarm emitter for detecting, from the signal states of said error signals, whether an abnormal state exists, and for emitting an alarm signal when an abnormal state is detected; and a selection circuit which, depending on whether an alarm emitter output alarm signal is present or absent, is used for selecting either equalization signals or decision signals, and which, when there is alarm signal input, is used for selecting equalization signals and for supplying them as input signals to said backward equalizer.

2. A decision-feedback type equalizer as claimed in claim 1, wherein said alarm emitter is so constituted that it monitors the magnitude of error signals and that, when frequency of which error signals exceeds a decision threshold value exceeds a predetermined value, it outputs an alarm signal as an error rate alarm signal.

3. A decision-feedback type equalizer as claimed in claim 1, wherein said alarm emitter comprises an error signal assessor for determining whether the magnitude of error signals is greater than a decision threshold value, a 1st counter for counting the number of times the magnitude of error signals is determined by said error signal assessor to be at or below said decision threshold value, and a 2nd counter for counting the number of times the magnitude of error signals is determined by said error signal assessor to be greater than said decision threshold value, and wherein said 1st counter resets said 2nd counter when the value of its count exceeds a 1st set value, and said 2nd counter produces said alarm signal when the value of its count exceeds a 2nd set value.

* * * * *